US008655280B2

(12) United States Patent
Hillyard et al.

(10) Patent No.: US 8,655,280 B2
(45) Date of Patent: Feb. 18, 2014

(54) METHOD AND SYSTEM FOR ROLE MANAGEMENT FOR COMPLEX BLUETOOTH® DEVICES

(71) Applicant: Broadcom Corporation, Irvine, CA (US)

(72) Inventors: Jason Hillyard, San Diego, CA (US); Jaku Jose, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/900,074

(22) Filed: May 22, 2013

(65) Prior Publication Data

US 2013/0252557 A1 Sep. 26, 2013

Related U.S. Application Data

(63) Continuation of application No. 11/019,072, filed on Dec. 21, 2004, now abandoned.

(60) Provisional application No. 60/613,180, filed on Sep. 23, 2004.

(51) Int. Cl.
*H04W 4/08* (2009.01)
(52) U.S. Cl.
USPC ........................................ 455/41.2
(58) Field of Classification Search
USPC ......... 455/572–574, 444, 41.2; 370/331, 338, 370/401, 440, 465–466; 709/228, 248
See application file for complete search history.

(56) References Cited

U.S. PATENT DOCUMENTS

| | | | | |
|---|---|---|---|---|
| 6,973,335 | B2* | 12/2005 | Ganton | 455/573 |
| 2004/0117507 | A1* | 6/2004 | Torma | 709/248 |
| 2004/0258033 | A1 | 12/2004 | Heinonen et al. | |
| 2004/0266494 | A1* | 12/2004 | Ruuska et al. | 455/574 |
| 2005/0020322 | A1 | 1/2005 | Ruuska et al. | |
| 2005/0058109 | A1* | 3/2005 | Ekberg | 370/338 |
| 2005/0065768 | A1* | 3/2005 | Karaoguz et al. | 703/27 |
| 2006/0072525 | A1 | 4/2006 | Hillyard et al. | |
| 2007/0105548 | A1* | 5/2007 | Mohan et al. | 455/426.1 |
| 2008/0062958 | A1* | 3/2008 | Jonsson et al. | 370/350 |
| 2008/0287160 | A1* | 11/2008 | Sasai et al. | 455/556.2 |
| 2009/0034477 | A1* | 2/2009 | Yamaguchi et al. | 370/331 |
| 2010/0278077 | A1* | 11/2010 | Reunamaki et al. | 370/254 |

* cited by examiner

*Primary Examiner* — Kamran Afshar
*Assistant Examiner* — Khawar Iqbal
(74) *Attorney, Agent, or Firm* — Thomas | Horstemeyer, LLP

(57) ABSTRACT

Methods and systems for controlling a plurality of personal area network access devices are disclosed herein. In a personal area network device, a new connection is received from another personal area network device in a personal area network. The new connection is associated with a first application having a first role preference. It is determined whether the first role preference conflicts with a current role. It is determined whether the first role preference conflicts with a second role preference associated with a second application using the current role. The current role is switched to a role specified in the first role preference in response to determining that the first role preference conflicts with the current role and that the first role preference does not conflict with the second role preference.

20 Claims, 13 Drawing Sheets

| Desired Role Table | | |
|---|---|---|
| Profile ID | Application ID | Desired Role |
| profile_x | 1 | Master |
| profile_y | 2 | Master |
| profile_y | 3 | Any |
| profile_z | 4 | Any |

METHOD AND SYSTEM FOR ROLE MANAGEMENT FOR COMPLEX BLUETOOTH® DEVICES

CROSS-REFERENCE TO RELATED APPLICATIONS/INCORPORATION BY REFERENCE

This application is a continuation of, and claims priority to, co-pending U.S. patent application entitled "METHOD AND SYSTEM FOR ROLE MANAGEMENT FOR COMPLEX BLUETOOTH® DEVICES," filed on Dec. 21, 2004, and assigned application Ser. No. 11/019,072, which makes reference to, claims priority to, and claims the benefit of United States Provisional Application entitled "Method And System For Role Management Mechanism For Complex Bluetooth® Devices" filed on Sep. 23, 2004, and assigned application No. 60/613,180.

FIELD OF THE INVENTION

Certain embodiments of the invention relate to wireless communication. More specifically, certain embodiments of the invention relate to a method and system for role management for complex Bluetooth® devices.

BACKGROUND OF THE INVENTION

Bluetooth® wireless technology is set to revolutionize personal connectivity by providing freedom from wired connections. Bluetooth® is a specification for a small form-factor, low-cost radio solution providing links between mobile computers, mobile phones and other portable and handheld devices.

Bluetooth® wireless technology is an international, open standard for allowing intelligent devices to communicate with each other through wireless, short-range communications. This technology allows any sort of Bluetooth® compliant device—from computers and cell phones to keyboards and headphones—to make its own connections, without wires, cables or any direct action from a user. Bluetooth® is currently incorporated into numerous commercial products including laptops, PDAs, cell phones, and printers, with more products coming out every day.

Two or more complex Bluetooth® devices may be connected in a network, where each device may be characterized by a role, such as a master role and/or a slave role, for example. During operation of the connected complex Bluetooth® devices, one or more of the roles may be switched. For example, one or more roles may be switched upon connection of an additional complex Bluetooth® device to the existing network of connected Bluetooth® devices. Role switching within a conventional network of Bluetooth® devices is often times not supported and/or managed during operation of the Bluetooth® devices. This may cause rejection of a new Bluetooth® connection requests and/or dropping of existing Bluetooth® connections due to unsupported role profiles and/or unauthorized role switching requests within the conventional network of Bluetooth® devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for controlling a plurality of personal area network access devices. Aspects of the method may comprise determining current roles for communicating complex Bluetooth® devices. In response to receiving a new connection, it may be determined whether to switch from at least one of the determined current roles based on stored role switching information. If a role switch is allowed, at least one new role may be switched based on the stored role switching information. Each of the determined current roles and the new role comprise a master only role, a slave only role, and/or "any" role, where the "any" role may comprise a master or slave role.

If the "any" role is allowed, at least one of the master role and/or the slave role may be switched. If the "any" role is allowed, the determined current roles may be preserved for at least one of the communicating complex Bluetooth® devices. The stored role switching information may be stored in a lookup table and the lookup table may comprise at least one role corresponding to the received new connection. The lookup table may comprise applications and/or at least one role corresponding to each of the applications. The lookup table may also comprise at least one profile associated with each of the applications. It may be determined whether a role required by the received new connection conflicts with at least one role associated with one or more of the communicating complex Bluetooth® devices required for the received new connection.

If the role required by the received new connection conflicts with the at least one role associated with one or more of the communicating complex Bluetooth® devices required for the received new connection, at least one new role may be switched based on the stored role switching information. It may be determined whether the received new connection comprises a scatternet connection. If the received new connection comprises a scatternet connection, at least one new role may be switched based on the stored role switching information.

Another embodiment of the invention may provide a machine-readable storage, having stored thereon, a computer program having at least one code section executable by a machine, thereby causing the machine to perform the steps as described above for controlling a plurality of personal area network access devices.

Aspects of the system for controlling a plurality of personal area network access devices may comprise at least one processor that determines current roles for communicating complex Bluetooth® devices. In response to receiving a new connection, the processor may determine whether to switch from at least one of the determined current roles based on stored role switching information. If a role switch is allowed, the at least one new role may be switched by the processor based on the stored role switching information. Each of the determined current roles and the at least one new role may comprise a master only role, a slave only role, and/or "any" role, where the "any" role may comprise a master or slave role. If the "any" role is allowed, the master role and/or the slave role may be switched by the processor.

If the "any" role is allowed, the determined current roles for at least one of the communicating complex Bluetooth® devices may be preserved by the processor. The stored role switching information may be stored in a lookup table, where the lookup table may comprise at least one role corresponding to the received new connection. The lookup table may comprise one or more applications, at least one role corresponding to each of the applications, and at least one profile associated with each of the applications. The processor may determine whether a role required by the received new connection conflicts with a role associated with one or more of the communicating complex Bluetooth® devices required for the received new connection.

If the role required by the received new connection conflicts with the role associated with one or more of the communicating complex Bluetooth® devices, a new role based on the stored role switching information may be switched by the processor. The processor may determine whether the received new connection comprises a scatternet connection. If the received new connection comprises a scatternet connection, a new role based on the stored role switching information may be switched by the processor.

These and other advantages, aspects and novel features of the present invention, as well as details of an illustrated embodiment thereof, will be more fully understood from the following description and drawings.

DETAILED DESCRIPTION OF THE INVENTION

The Bluetooth® community has recently developed specifications that define how to use streaming audio over a Bluetooth® link. This opens up the technology to a whole new class of audio devices, such as wireless stereo headsets, wireless speakers, and wireless portable MP3 players just to name a few. With the introduction of new Bluetooth® specifications for streaming audio, new Bluetooth® products such as wireless stereo headsets and wireless file streaming applications are becoming a reality. The Bluetooth® streaming audio system is defined by three Bluetooth® specifications plus a number of ISO/IEC audio standards and RFC Internet standards.

Figure 1:
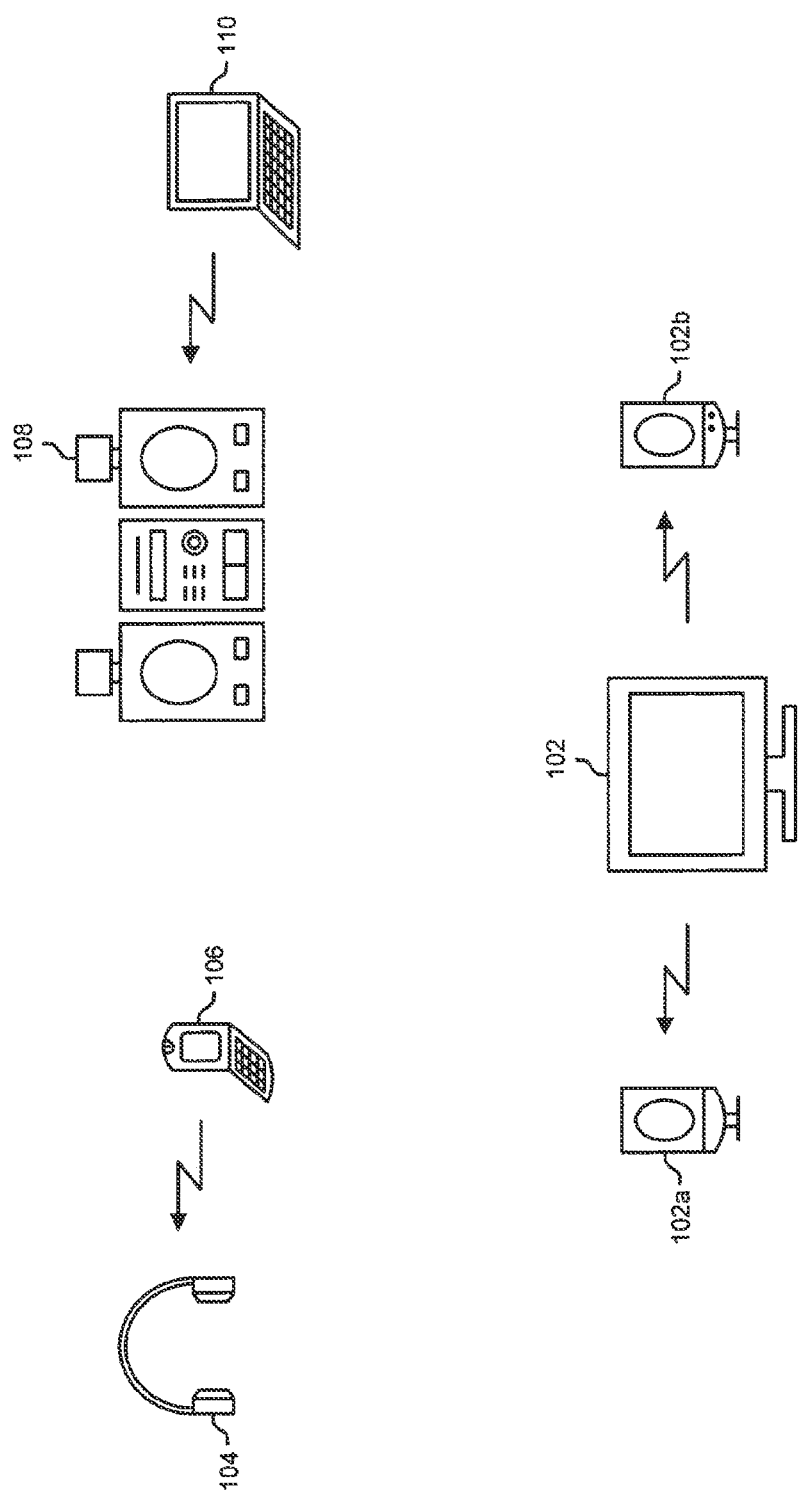
FIG. 1 is a diagram illustrating some examples of Bluetooth® (BT) streaming audio devices.

FIG. 1 is a diagram illustrating some examples of Bluetooth® (BT) streaming audio devices. Referring to FIG. 1, there is shown a stereo headset 104, a mobile phone 106, a Bluetooth®-enabled stereo system 108, personal computers (PC) 110 and 102, and stereo speakers 102a and 102b. The stereo headset 104 may receive streaming audio from MP3 files stored on the mobile phone 106. The headset 104 may also function as a normal Bluetooth® telephony headset for phone calls. The Bluetooth®-enabled stereo system 108 may receive streaming audio from MP3 files stored on the PC 110, solving the problem of how to get the MP3's from the PC 110 to the stereo system 108. The PC 102 may play stereo audio to the pair of Bluetooth® wireless speakers 102a and 102b, thus freeing the desktop from wired clutter.

Bluetooth® is a frequency hopping spread spectrum (FHSS) radio system operating in the 2.4 GHz unlicensed band. Its low power transmissions allow a typical range of about 10 meters. Devices may connect to each other to form a network known as a piconet, with up to seven active devices in the piconet. The maximum data throughput between devices is approximately 723 kilobits per second (kbps), with the data capacity shared between devices on the piconet.

Bluetooth® has a protocol stack to transfer data and implement the advanced features required by applications. The protocol stack may comprise several different protocols designed for different purposes. Various profiles, or applications, may reside above the protocol stack. Bluetooth® may also comprise a lower protocol stack for link management and baseband control.

Figure 2:
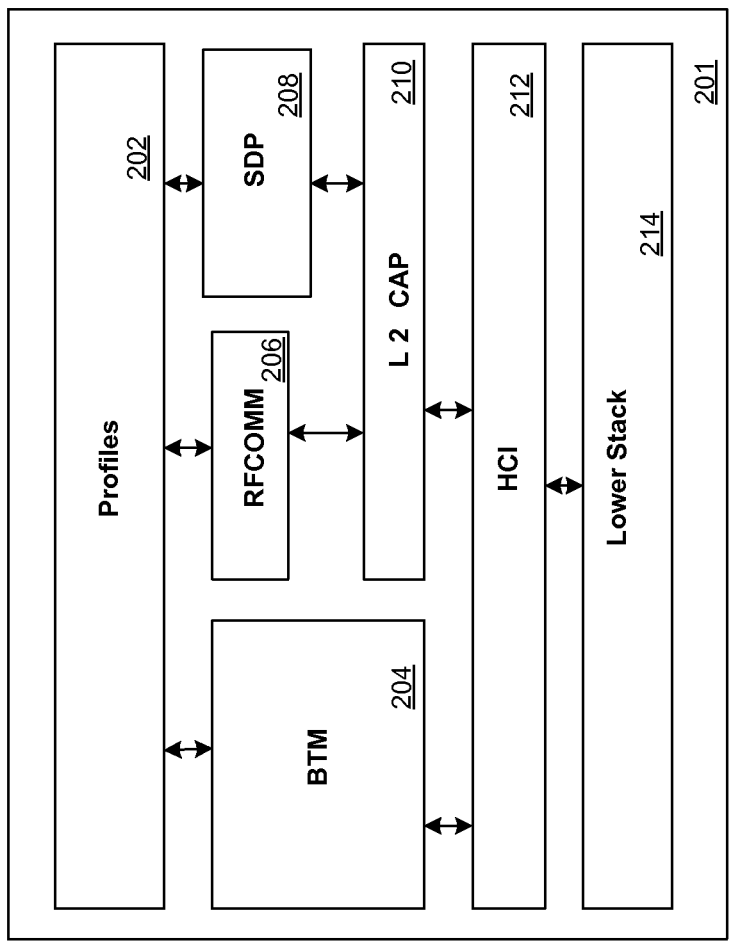
FIG. 2 is a simplified exemplary protocol stack.

FIG. 2 is a simplified exemplary protocol stack. Referring to FIG. 2, there is illustrated an exemplary Bluetooth® protocol stack 201. The exemplary Bluetooth® protocol stack 201 may comprise profiles protocol 202, Bluetooth® management entity (BTM) protocol 204, radio frequency communication (RFCOMM) protocol 206, service discovery protocol (SDP) 208, logical link control and adaptation protocol (L2CAP) 210, host controller interface (HCI) 212, and a lower stack 214. The profiles protocol 202 may comprise profiles of one or more applications that may be utilized in connection with the Bluetooth® protocol stack. The BTM protocol 204 makes it possible for various equipment to have wireless communication by integrating with a Bluetooth® module. The RFCOMM protocol 206 may be utilized to provide emulation of RS-232 serial ports over the L2CAP protocol. The RFCOMM protocol 206 may be utilized to emulate RS-232 control and data signals over the baseband, providing both transport capabilities for upper level services, such as OBEX, that use serial line as the transport mechanism.

The SDP 208 may be utilized for querying Bluetooth® device information, Bluetooth® device services, and characteristics of the services. The L2CAP 210 may be utilized to support higher level protocol multiplexing, packet segmentation and reassembly, and quality of service (QoS). L2CAP 210 may permit higher-level protocols and applications to transmit and receive data packets up to 64 kilobytes in length. The HCI 212 may be adapted to provide a command interface to the baseband controller, link manager, and access to hardware status and control registers.

Figure 3:
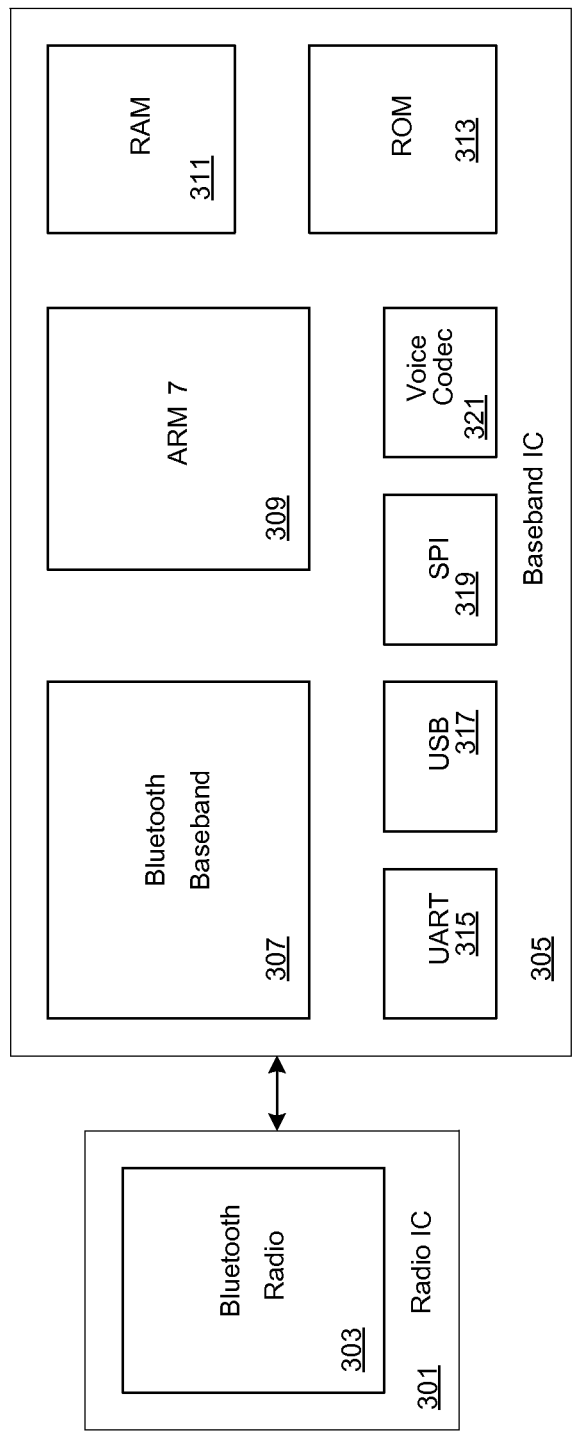
FIG. 3 is a block diagram illustrating an exemplary Bluetooth® hardware implementation.

Bluetooth® hardware implementations are typically highly integrated systems consisting of one or two chips. FIG. 3 is a block diagram illustrating an exemplary Bluetooth® hardware implementation. Referring to FIG. 3, the Bluetooth® hardware implementation may comprise a Bluetooth® baseband integrated circuit (IC) 305 and a radio IC 301. The radio IC 301 may comprise a Bluetooth® radio circuit 303. The baseband IC 305 may comprise Bluetooth® baseband circuit 307, ARM7 processor 309, random access memory (RAM) 311, read only memory (ROM) 313, voice codec 321, a serial peripheral interface (SPI) 319, universal serial bus (USB) 317, and universal asynchronous receiver/transmitter (UART) 315. The radio IC 301 may be implemented in a separate chip. The ARM7 processor 309 may be adapted to operate all the required software including lower stack, upper stack, and embedded profile, for example. This type of single CPU implementation allows for a small, low power, and low cost solution.

The 723 kbps throughput of a Bluetooth® link may be suitable for streaming audio utilizing MP3 and/or other codec formats. Bluetooth® streaming audio may be defined by three Bluetooth® specifications covering the protocol and profiles: AVDTP, GAVDP, and A2DP. The Audio/Video Distribution Transport Protocol (AVDTP) is the protocol designed especially for Bluetooth® streaming audio and video. It may perform the signaling to configure, open, and/or close a stream between two devices. A/V stream data may be transferred utilizing real-time protocol (RTP) packets. AVDTP sits in the protocol stack above L2CAP and may utilize separate L2CAP channels for signaling and data. The Generic Audio/Video Distribution Profile (GAVDP) is an abstract profile that defines how applications can use AVDTP. The Advanced Audio Distribution Profile (A2DP) defines how Bluetooth® streaming audio applications work. It defines how to get and set audio codec parameters for MPEG and/or other codecs. The A2DP may also define the media payload formats for packaging audio stream data into packets and may contain the specification for a new audio codec called SBC.

Figure 4:
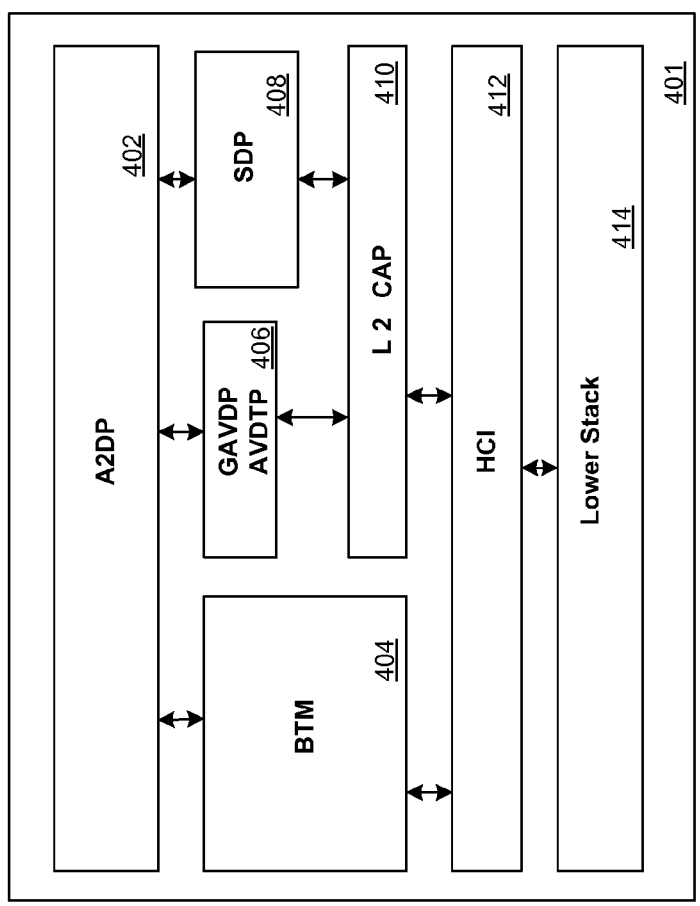
FIG. 4 is a block diagram illustrating a Bluetooth® protocol stack for streaming audio.

FIG. 4 is a block diagram illustrating a Bluetooth® protocol stack for streaming audio. Referring to FIG. 4, the Bluetooth® protocol stack for streaming audio 401 may comprise A2DP 402, Bluetooth® management entity (BTM) protocol 404, GAVDP/AVDTP 406, service discovery protocol (SDP) 408, logical link control and adaptation protocol (L2CAP) 410, host controller interface (HCI) 412, and a lower stack 414. In addition to the Bluetooth® specifications illustrated on FIG. 4, there are several ISO/IEC and Internet RFC specifications used for Bluetooth® streaming audio, which are summarized in Table 1.

TABLE 1

Additional specifications used for Bluetooth ® streaming audio

| Specification | Description |
|---|---|
| ISO/IEC 11172 part 3 | MPEG audio |
| ISO/IEC 13818 part 3 | MPEG audio |
| ISO/IEC 13818 part 7 | MPEG advanced audio |
| ISO/IEC 14496 part 3 | MPEG advanced audio |
| RFC 1889 | Real-time protocol (RTP) |
| RFC 2733 | RTP error correction |
| RFC 3095 | Packet header compression |
| RFC 2250 | RTP payload format |
| RFC 3016 | RTP payload format |
| RFC 3119 | RTP payload format |

Figure 5:
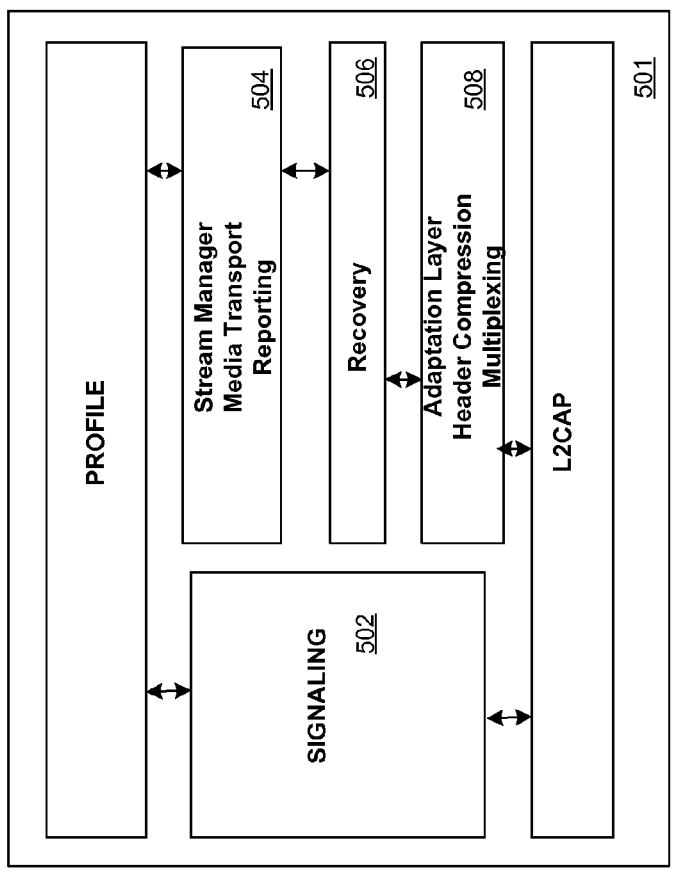
FIG. 5 is a block diagram illustrating AVDTP protocol features.

The bulk of the Bluetooth® streaming A/V system may be implemented in the AVDTP protocol. FIG. 5 is a block diagram illustrating AVDTP protocol features. Referring to FIG. 5, the AVDTP protocol may comprise a portion of the Bluetooth® protocol stack 501 and may be divided into four subsystems: signaling 502, stream management 504, recovery 506, and adaptation layer 508. AVDTP signaling messages 502 are used to discover, configure, open, and close a stream between two devices. There are eleven message types with some messages being optional.

A media transport feature of the stream manager 504 may be utilized to transfer RTP packets containing audio data. This feature is a required feature of AVDTP. The reporting feature of the stream manager 504 may allow link quality information, such as jitter and packet loss, to be exchanged utilizing the protocols defined in RFC 1889. This is an optional feature. The recovery feature 506 adds extra packets containing error correction data to the packet transfer. This feature may allow for lost packets to be recovered. The recovery mechanism is defined by RFC 2733. This is an optional feature and may require additional ROM and/or RAM.

A header compression feature of the adaptation layer 508 allows the RTP header to be compressed, as defined by RFC 3095. When used with AVDTP, the RTP header may be reduced by 5 to 7 bytes. This savings may probably not be worth the effort of implementing the feature especially when large media packets are used. A multiplexing feature of the AVDTP adaptation layer 508 allows L2CAP channels to be shared by media, reporting, and/or recovery packets, therefore resulting in fewer L2CAP channels and better baseband channel capacity utilization. This complex feature may be useful for devices which use multiple simultaneous streams with reporting and recovery.

A device implementing Bluetooth® streaming audio may need to consider several issues, which are not fully covered by the Bluetooth® specifications. Such issues may be related to implementation of optional features, multiple streams support, and/or data flow and synchronization issues, for example. One or more of these issues may be beyond the scope of the Bluetooth® specification.

Figure 6:
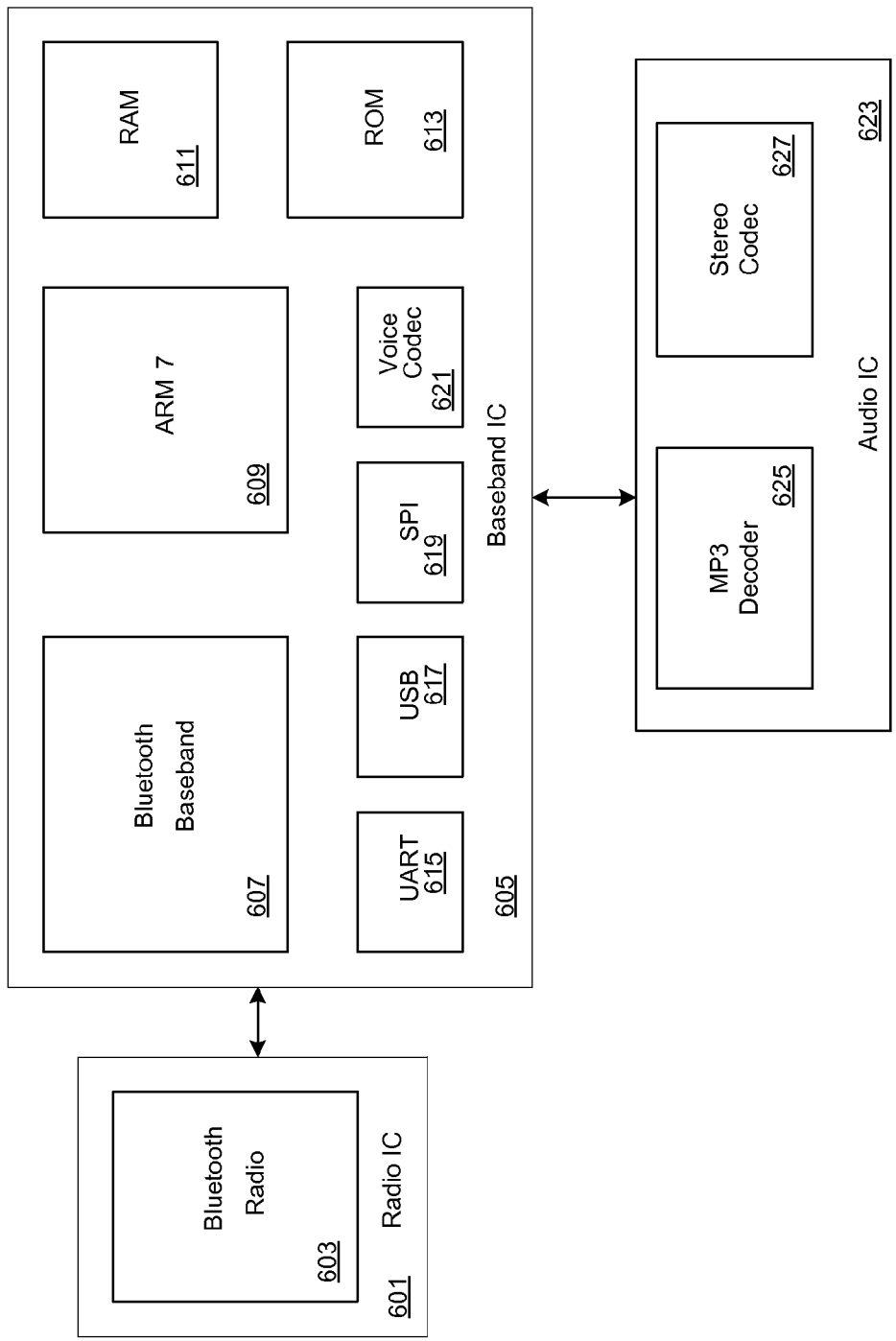
FIG. 6 is illustrated an exemplary hardware implementation for streaming audio playback.

FIG. 6 illustrates an exemplary hardware implementation for streaming audio playback. Referring to FIG. 6, the Bluetooth® hardware implementation for streaming audio playback may comprise a Bluetooth® baseband integrated circuit (IC) 605, a radio IC 601, and an audio IC 623. The radio IC 601 may comprise a Bluetooth® radio circuit 603. The audio IC 623 may comprise an MP3 decoder 625 and a stereo codec circuit 627. The baseband IC 605 may comprise Bluetooth® baseband circuit 607, ARM7 processor 609, random access memory (RAM) 611, read only memory (ROM) 613, voice codec 621, a serial peripheral interface (SPI) 619, universal serial bus (USB) 617, and universal asynchronous receiver/transmitter (UART) 615. The radio IC 601 and the audio IC 623 may be implemented in separate chips. The ARM7 processor 609 may be adapted to operate all the required software including lower stack, upper stack, and embedded profile, for example. Data received over the Bluetooth® link may be processed by the protocol stack and passed to an application. The application may acquire the audio stream data and may communicate it over a hardware interface to the audio IC 623. The audio IC 623 may decode the digital audio and may convert the audio signal to analog signal.

Implementing AVDTP with the minimum required features may require multiple streams support. For the simple streaming audio device examples shown in FIG. 1, optional features such as recovery, reporting, header compression, and multiplexing may not be required as Bluetooth® devices may be adapted to perform adequately without such features.

Maintaining a data transfer with a constant bit rate on a Bluetooth® link may be difficult to achieve. If data is sent too slowly, the audio decoder may run out of stream data to process, causing an audible error. Lost data packets may also cause the same problem. On the other hand, if data is sent too quickly, then data may be buffered up at the audio decoder, eventually causing congestion or data loss when the device runs out of buffer space. Since there is no flow control mechanism built into AVDTP or L2CAP, other mechanisms may be utilized to prevent data loss. The mechanism used by the audio source, or device sending the stream, may depend on the type of source. If the source is "live" and audio stream data is provided by an audio encoder, then the encoder itself may provide the constant bit rate. If the source is from a file, then a timer may be utilized to maintain a constant bit rate.

To understand the idea behind using a timer, consider this example. A device is sending an MP3 stream from a file encoded at 128 kbps and 48 kHz sample frequency. Referring to Table 2a, this means an MP3 audio frame 384 bytes long is sent every 24.0 ms. If the device simply sets a periodic timer for 24.0 ms and sends a packet when the timer expires, the constant bit rate will be maintained.

TABLE 2a

Audio frame sizes for SBC and MP3.
Audio Frame Size vs. Data Rate and Sample Frequency

|  | SBC | | | MP3 | | |
| --- | --- | --- | --- | --- | --- | --- |
|  | 64 kbps | 128 kbps | 320 kbps | 64 kbps | 128 kbps | 320 kbps |
| 48 kHz | 20 | 42 | 108 | 192 | 384 | 960 |
| 44.1 kHz | 22 | 46 | 118 | 209 | 418 | 1045 |
| 32 kHz | 32 | 64 | 162 | 228 | 576 | 1440 |

TABLE 2b

Audio frame periods for SBC and MP3.
Audio Frame Period vs. Sample Frequency

|  | SBC | MP3 |
| --- | --- | --- |
| 48 kHz | 2.667 ms | 24.0 ms |
| 44.1 kHz | 2.902 ms | 26.122 ms |
| 32 kHz | 4.0 ms | 36.0 ms |

SBC frames may be small with a short period, as illustrated in Table 2b with regard to several typical values for SBC and MP3 audio frame periods. Some devices may have problems using timers or processing data at such short intervals. This suggests that rather than send a small packet containing a single frame at very short intervals, a larger packet containing several frames at longer intervals may be communicated instead. The maximum size of MP3 frames may correspond to the L2CAP MTU of the AVDTP transport channel, such that audio frames may not need to be fragmented across AVDTP packets.

Consider an example, in which a packet is sent every 24 ms. Consider what happens if the timer isn't so accurate and the packet actually gets sent at 20 ms or 29 ms. If a packet arrives late, the audio decoder may run out of data. Therefore, even a slight inaccuracy may cause malfunction if every packet is expected to be sent on time. A better approach would be to provide some slack in the data flow. Assuming the device receiving the stream is adapted to buffer up at least a few packets, a number of packets may be communicated as fast as possible when streaming starts. This helps with timer inaccuracy and data delayed by lost packets as well. The amount of packets that may be buffered may depend on the specific implementation of the device receiving the stream. The device receiving the stream may also improve the data flow.

Regardless of how fast or slow the peer is sending the stream, the device receiving the stream can smooth out the flow by delaying playback until a number of packets have been received. This helps with timer inaccuracy and data delayed by lost packets.

When more than one stream is transferred between devices, the stream playback may be synchronized. Consider the example of the wireless PC speakers shown in FIG. 1. The PC may communicate a Bluetooth® audio stream to each speaker. There are actually two synchronization problems in this example. First, the audio playback of the two speakers may need to be synchronized with each other. Second, the audio playback may need to be synchronized with the display on the PC. Although the Bluetooth® specifications do not cover synchronization issues, there are some features of the system that may be utilized to address these synchronization problems.

Every Bluetooth® device has a free-running system clock, which determines the timing of the frequency-hopping transceiver. In a piconet, the slave devices are synchronized to the master's system clock. The speakers may both be synchronized to the Bluetooth® clock timing of the PC. Depending on the implementation of the Bluetooth® chip, it may be possible for an application to derive a timer based on the PC clock. The PC clock may be utilized in conjunction with the RTP presentation timestamp in the packet to synchronize the playback. Therefore, it may be possible to utilize the piconet timing as a synchronization source between the two speakers.

The second part of the synchronization problem boils down to how much delay is present from when the PC sends the audio stream to when the speakers play it back. Studies show that a delay larger than 80 ms may be noticeable in situations like this. As discussed earlier, however, it may be desirable for the device receiving a stream to buffer up a few audio frames before playback to help maintain a constant data rate on the link. This 80 ms limit may be an upper bound of how many frames to buffer. For example, an MP3 stream sampled at 44.1 kHz has a frame period of 26.122 ms. Therefore, no more than three frames may be buffered to keep delay under the timing corresponding to the limit.

Certain embodiments of the invention may be found in a method and system for role management mechanism for complex Bluetooth® devices. Aspects of the method may comprise determining current roles for communicating complex Bluetooth® devices. In response to receiving a new connection, it may be determined whether to switch from at least one of the determined current roles based on stored role switching information. If a role switch is allowed, at least one new role may be switched based on the stored role switching information. Each of the determined current roles and the new role comprise a master only role, a slave only role, and/or "any" role, where the "any" role may comprise a master or slave role.

Bluetooth® wireless technology allows multiple simultaneous connections between devices. For example a PC may be connected to a Bluetooth® printer and a Bluetooth® mouse. A mobile phone may be connected to a Bluetooth® headset and a PC. This sort of complex Bluetooth® device may benefit from a role management mechanism that facilitates simultaneous connections. In Bluetooth®, two or more devices form a network called a piconet. With regard to the piconet, there may be one piconet master and up to seven piconet slaves, where a device's "role" is either master or slave. By default, a device that initiates a connection may be termed a master device and a device that accepts a connection may be termed a slave device. In addition, a device may be operating in more than one piconet simultaneously. For example a device may be operating as a master in a first piconet and as a slave in a second piconet, or as a slave in the first and the second piconets. This situation may be referred to as scatternet. Some Bluetooth® chips may be adapted to have better scatternet support than others. In this regard, some Bluetooth® chips may be adapted to support slave and master operating modes, slave and slave operating modes, while some do not provide any support for scatternet.

Bluetooth® wireless technology may also allow a device to switch its role in a piconet and role switching may be adapted to occur at any time. Role switching is often necessary and may even be required in certain circumstances. For example, a Bluetooth® network access point may require all peer devices to be slaves and initiate a role switch whenever a connection is attempted. Managing device roles and role switching is important because if an unsupported scatternet scenario arises, then the Bluetooth® link may be dropped.

One embodiment of the invention allows role switching to be configured for all connections or selectively configured for certain connections. It also allows role switching to take place intelligently when there are simultaneous connections with different role switching requirements. The invention may utilize a table that comprises the role switch information or role switch requirements. In accordance with an embodiment of the invention, there may be one entry per device and there may be additional entries for each application with role switch requirements. This table may be utilized by a logic function that determines whether or not to perform a role switch. The logic function may be executed when a connection to a Bluetooth® device is established or when an existing connection to a Bluetooth® device is closed. The logic function may also be executed when a Bluetooth® application-level connection is established or closed.

Figure 7:
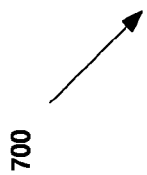
FIG. 7 is a block diagram of an exemplary table that may be utilized for role management, in accordance with an embodiment of the invention.

FIG. 7 is a block diagram of an exemplary table that may be utilized for role management, in accordance with an embodiment of the invention. Referring to FIG. 7, there is shown an exemplary role management table that comprises a plurality of indicated roles that may be utilized by a plurality of applications as specified in a plurality of profiles. The first column of the table of FIG. 7 comprise a plurality of profiles, each of which may be identified by a profile identifier, namely profile_x, profile_y and profile_z. The second column of the table of FIG. 7 comprises a plurality of applications, each of which may be identified by an application identifier, namely 1, 2, 3, and 4. The desired role that may be utilized by a particular application is indicated in the third column, and may include a master role, a slave role, or "any" role. "Any" role may refer to an application that me selectively function in a master role or a slave role.

In the exemplary table of FIG. 7, the application identified by application identifier 1 as specified in profile_x may be adapted to function with a desired role of master. The application identified by application identifier 2 as specified in profile_y may be adapted to function with a desired role of master, and the application identified by application identifier 3 as specified in profile_y may be adapted to function utilizing a desired role of master or slave (Any). Additionally, the application identified by application identifier 4 as specified in profile_z may be adapted to function utilizing a desired role of master or slave (Any).

Figure 8A:
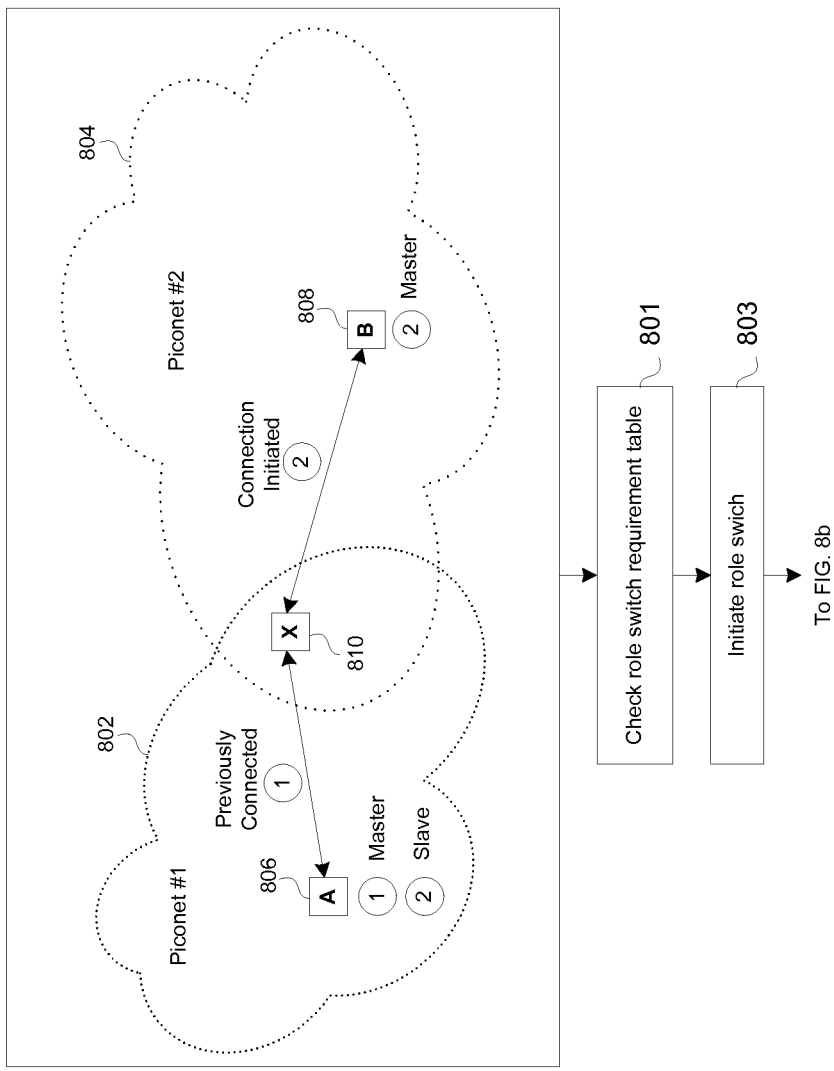
FIG. 8a is a block diagram illustrating an exemplary role switching scenario in which a first device accepts a connection from a second device, in accordance with an embodiment of the invention.

FIG. 8a is a block diagram illustrating an exemplary role switching scenario in which a first device accepts a connection from a second device, in accordance with an embodiment of the invention. Referring to FIG. 8a, there is shown a first piconet 802, a second piconet 804, a first Bluetooth® device (A) 806, a second Bluetooth® device (B) 808, and a third Bluetooth® device (X) 810.

The first Bluetooth® device (A) 806 is located within the first piconet 802 and is configured as a master. The second Bluetooth® device (B) 808 is located within the second piconet 804 and is configured as a master. Within the first piconet 802, the first Bluetooth® device (A) 806 is already connected via a first connection (1) to the third Bluetooth® device (X) 810 and in this regard, the first Bluetooth® device (A) 806 is operating as a slave while the third Bluetooth® device (X) 810 is operating as a master for this first connection (1). The second Bluetooth® device (B) 808 located within the second piconet 804 initiates a second connection (2) to the third Bluetooth® device (X) 810. This creates a scatternet scenario. After checking the role switching requirement table at 801, role switching may be initiated at 803.

Figure 8B:
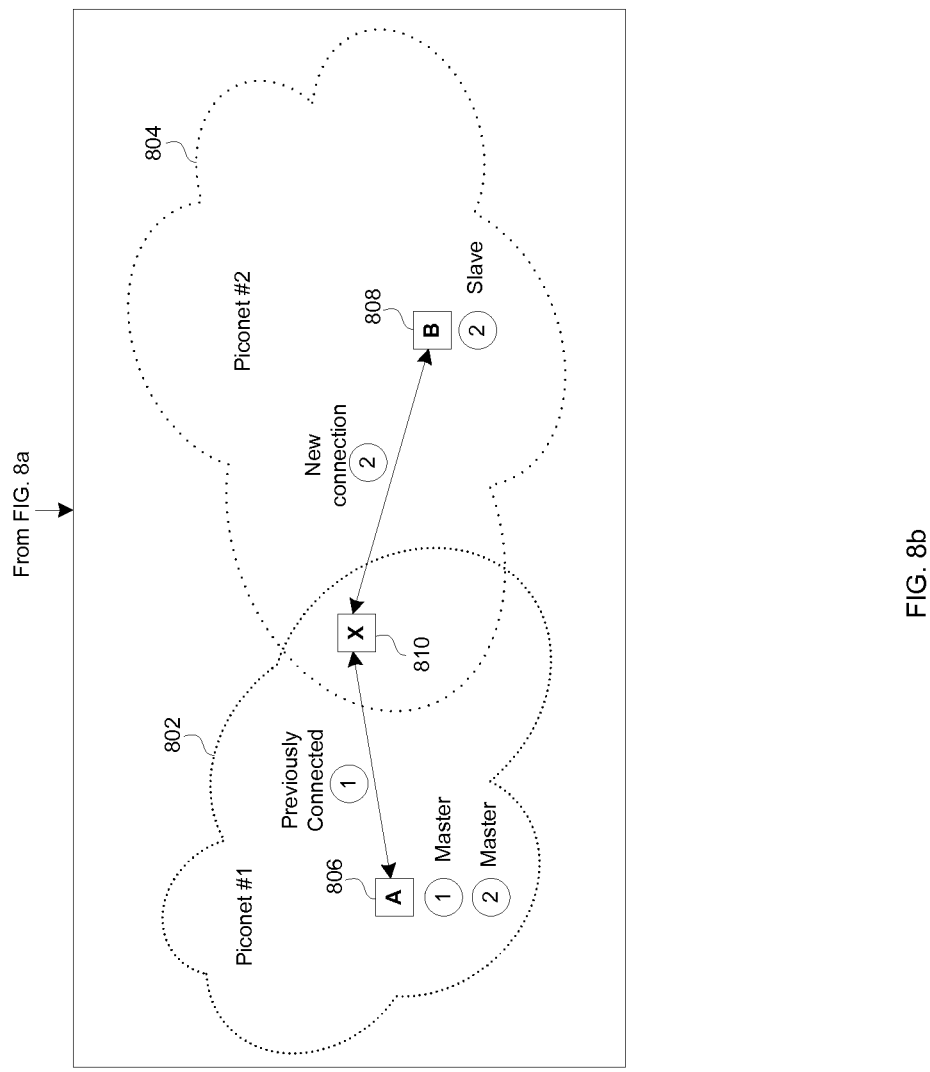
FIG. 8b is a block diagram illustrating the roles of the devices in FIG. 8a after the exemplary role switching scenario in completed, in accordance with an embodiment of the invention.

FIG. 8b is a block diagram illustrating the roles of the devices in FIG. 8a after the exemplary role switching scenario is completed, in accordance with an embodiment of the invention. Referring to FIG. 8b, after initiating role switching, the third Bluetooth® device (X) 810 may be adapted to operate as a master for the second connection that exists between the third Bluetooth® device (X) 810 and the second Bluetooth® device (B) 808 that initiated the connection. Since there may only be one master for a given connection, the role of the second Bluetooth® device (B) 808 that initiated the connection changes to a slave.

The exemplary role switching scenario illustrated in FIG. 8a and FIG. 8b may occur in the following scenario. The third Bluetooth® device (X) 810 may be a Bluetooth® enabled PC, which may already be communicating with the first Bluetooth® device (A) 806 via a first connection (1). The first Bluetooth® device (A) 806 may be a Bluetooth® enabled keyboard. For the first connection, the third Bluetooth® device (X) 810 is operating as a master device and the first Bluetooth® device (A) 806 is operating as a slave device. The second Bluetooth® device (B) 808, which may be a Bluetooth® enabled mouse, may initiate a second connection to the PC, which is the third Bluetooth® device (X) 810.

The third Bluetooth® device (X) 810 may be using, for example, a first profile, and the second Bluetooth® device (B) 808 and the first Bluetooth® device (A) 806 may be using, for example, a second profile. Notwithstanding, since the third Bluetooth® device (X) 810 is configured to operate as a master device, the role of the first Bluetooth® device (A) 806 is a slave. Once the second Bluetooth® device (B) 808 initiates the second connection (2) to the third Bluetooth® device (X), a scatternet scenario occurs and the role table may be consulted to determine what role switching should be initiated. Accordingly, the third Bluetooth® device (X) 818 may initiate a role switch and become a master for the initiated connection and the role of the second Bluetooth® device (B)808 may be switched to a slave.

Figure 9:
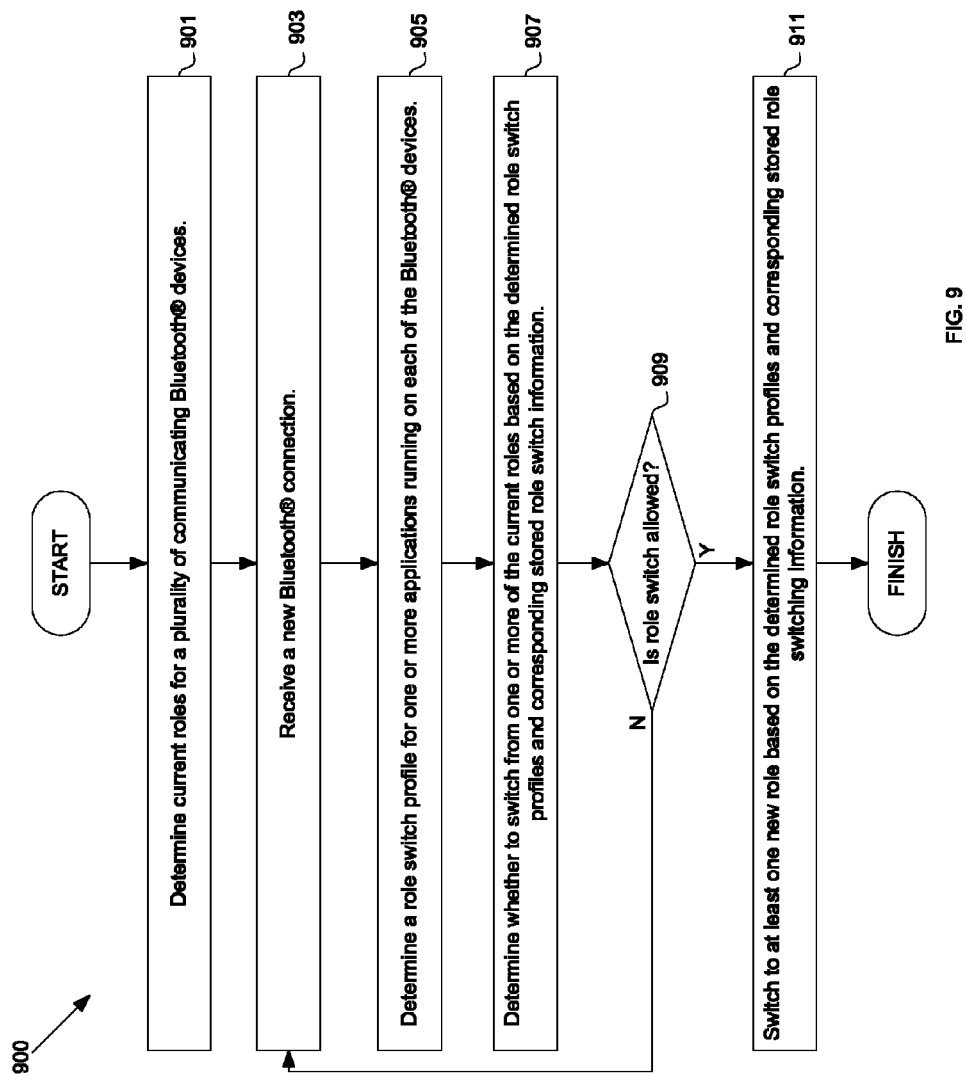
FIG. 9 is a flow diagram of an exemplary method for controlling a plurality of personal area network access devices, in accordance with an embodiment of the invention.

FIG. 9 is a flow diagram 900 of an exemplary method for controlling a plurality of personal area network access devices, in accordance with an embodiment of the invention. Referring to FIG. 9, at 901, current roles for a plurality of communicating Bluetooth® devices may be determined. At 903, a new Bluetooth® connection may be received. At 905, a role switch profile for one or more applications running on each of the Bluetooth® devices may be determined. At 907, it may be determined whether to switch from one or more of the current roles based on the determined role switch profiles and corresponding stored role switch information. For example, role switch information may be stored in a lookup table. The lookup table may comprise one or more profiles associated with each of the applications and one or more roles corresponding to each of the applications. At 909, it may be determined whether a role switch is allowed. If a role switch is not allowed, a new Bluetooth® connection may be received at 903. If a role switch is allowed, at 911, one or more new roles may be switched based on the determined role switch profiles and corresponding stored role switching information.

Figure 10:
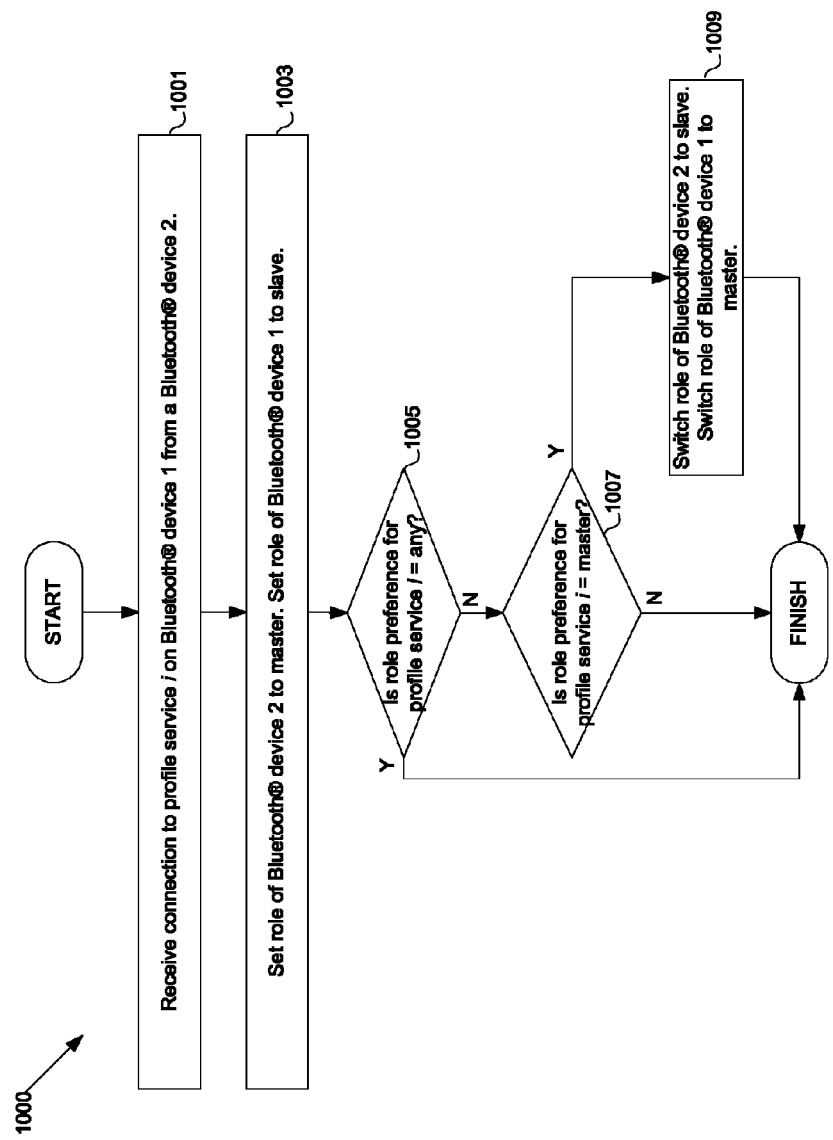
FIG. 10 is a flow diagram of an exemplary method for role switching in a Bluetooth® device supporting multiple profile services, in accordance with an embodiment of the invention.

FIG. 10 is a flow diagram 1000 of an exemplary method for role switching in a Bluetooth® device supporting multiple profile services, in accordance with an embodiment of the invention. Referring to FIG. 10, at 1001, profile service i on Bluetooth® device 1 may receive a connection from Bluetooth® device 2. In one aspect of the invention, Bluetooth® device 1 may be adapted to support i-number of profile services, or Bluetooth® connection profiles. At 1003, since Bluetooth® device 2 initiates a connection with Bluetooth® device 1, a role of Bluetooth® device 2 may be set to master and a role of Bluetooth® device 1 may be set to slave. At 1005, it may be determined whether the role preference for profile service i is set to "any." If the role preference for profile service i is not set to "any," at 1007, it may be determined whether the role preference for profile service i is set to master. If the role preference for profile service i is set to master, at 1009, role of Bluetooth® device 2 may be switched to slave and role of Bluetooth® device 1 may be switched to master.

In an exemplary aspect of the invention, a Bluetooth® device may be adapted to provide two serial port profile services, one for a multiplayer game and one for an AT command interface, for example. The AT command interface may be characterized with no role preference and, therefore, may support either a master or a slave role upon connection to a new Bluetooth® device. The serial port profile service, however, may be associated with a master profile. When a peer Bluetooth® device connects to the profile service, a role switch may be initiated so that the peer Bluetooth® device is in a slave role.

Figure 11:
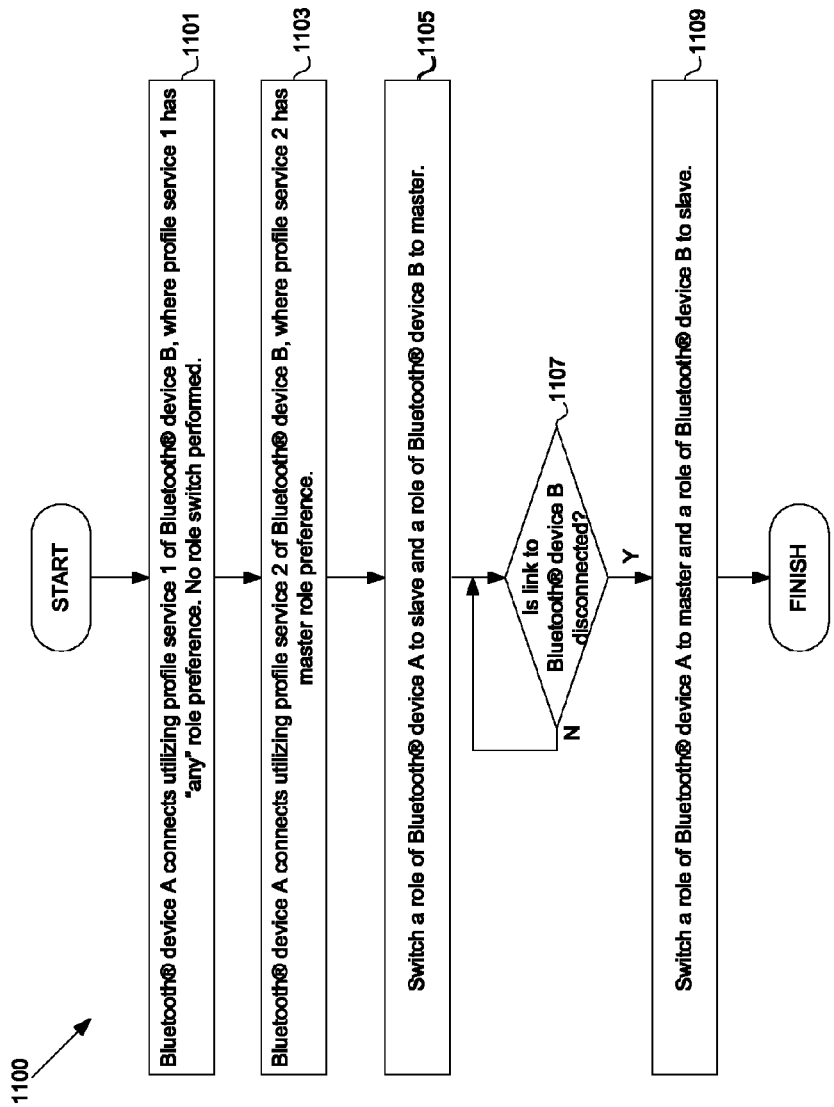
FIG. 11 is a flow diagram of an exemplary method for role switching in a Bluetooth® device supporting simultaneous profile services with different role preferences, in accordance with an embodiment of the invention.

FIG. 11 is a flow diagram 1100 of an exemplary method for role switching in a Bluetooth® device supporting simultaneous profile services with different role preferences, in accordance with an embodiment of the invention. Referring to FIG. 11, at 1101, Bluetooth® device A may connect utilizing profile service 1 of Bluetooth® device B, where profile service 1 may be associated with "any" role preference. In one aspect of the invention, Bluetooth® device B may be characterized with one or more profile services, or Bluetooth® connection profiles, which may support simultaneous connections with different role preferences. Since profile service 1 is associated with "any" role preference, no role switch may be performed. At 1103, Bluetooth® device A may connect utilizing profile service 2 of Bluetooth® device B, where profile service 2 may be associated with a master role preference. At 1105, a role of Bluetooth® device A may be switched to slave and a role of Bluetooth® device B may be switched to master. At 1107, it may be determined whether a link to Bluetooth® device B is disconnected. If link to Bluetooth® device B is disconnected, at 1109, a role of Bluetooth® device A may be switched to master and a role of Bluetooth® device B may be switched to slave.

In an exemplary aspect of the invention, a first Bluetooth® device may be adapted to support two Bluetooth® services—a headset and a serial port service. The headset service may require master role and the serial port may be associated with "any" preference. A second Bluetooth® device may connect utilizing the serial port profile. Since the serial port service is associated with "any" role profile, no role switch may be performed. The second Bluetooth® device may also connect utilizing the headset profile. Since the headset profile is associated with a master role, a role switch may be initiated so that the first Bluetooth® device operates in master role. While connection occurs utilizing the headset profile, the second Bluetooth® device may not switch to master role. If the connection utilizing the headset profile is disconnected and the connection utilizing the serial port profile is still connected, the second Bluetooth® device may switch its role to master.

In another aspect of the invention, on startup or initialization of a Bluetooth® chip, it may be determined where scatternet is supported and if so, to what extent a scatternet is supported. For example, the Bluetooth® device may not be capable of supporting scatternet operation. In instances where a Bluetooth® device is not adapted to support scatternet, then a role switch may be attempted whenever it is determined that an incoming or outgoing connection would create a scatternet. The Bluetooth® device may be adapted to support a partial scatternet. For partial scatternet, the Bluetooth® device may be adapted to support scatternet for only a limited period of time. In this case, a role switch may be attempted so as to prevent the Bluetooth® device from being in scatternet mode in perpetuity. The Bluetooth® device may also be adapted to support full scatternet, in which case the Bluetooth® device may be adapted to support scatternet with no restrictions. If the desired device capability does not support scatternet, the desired role for an incoming connection may be set to master. For an incoming connection, the Bluetooth® device may accept this connection with the device operating in a master role, for example.

Figure 12:
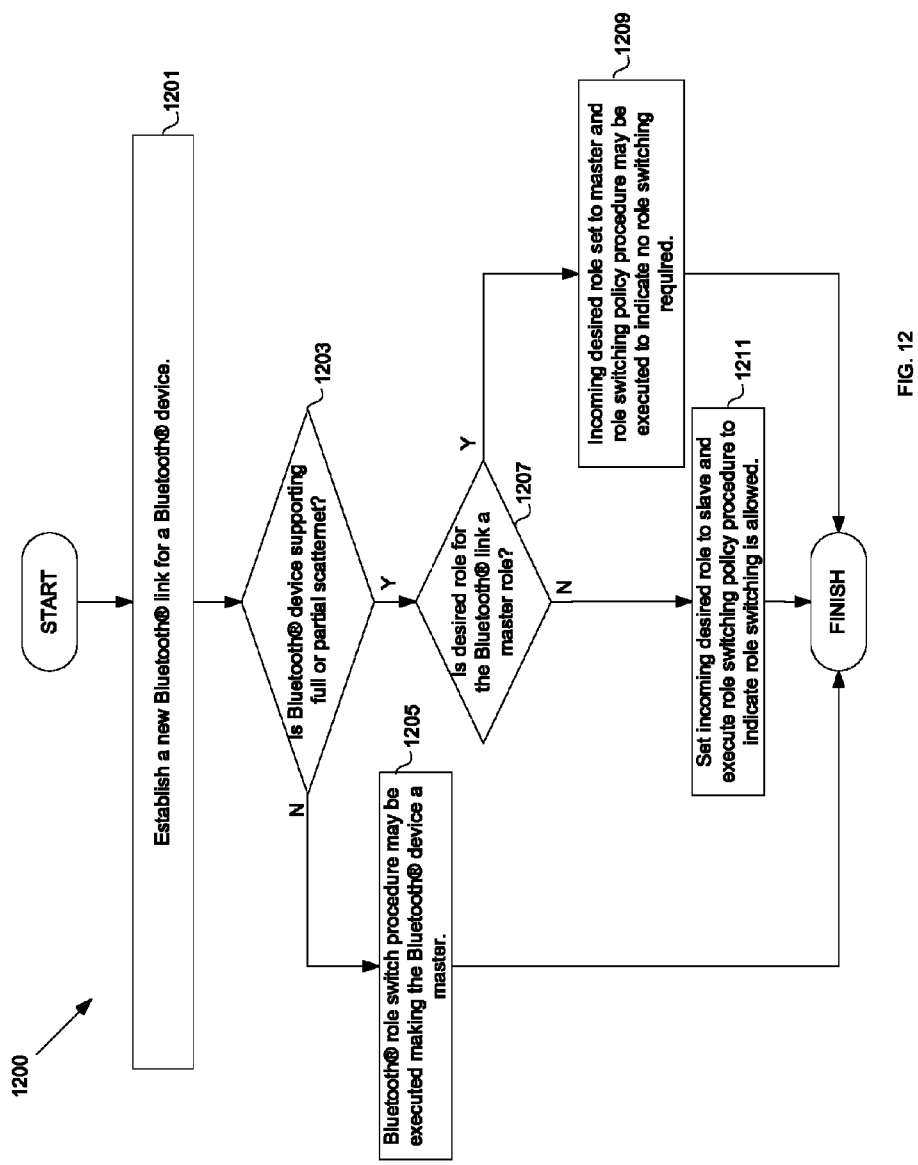
FIG. 12 is a flow diagram of an exemplary method for role switching in a Bluetooth® device supporting full or partial scatternet, in accordance with an embodiment of the invention.

FIG. 12 is a flow diagram 1200 of an exemplary method for role switching in a Bluetooth® device supporting full or partial scatternet, in accordance with an embodiment of the invention. Whenever a link is connected or disconnected, role adjustment may be initiated. Referring to FIG. 12, at 1201, a new Bluetooth® link to a Bluetooth® device may be established. At 1203, during role adjustment, for each of the links that are connected, it may be determined whether the Bluetooth® device is capable of supporting full scatternet or partial scatternet. If the Bluetooth® device is capable of supporting full scatternet or partial scatternet, at 1207, it may be determined whether the current desired role associated with the Bluetooth® link is a master role.

If the Bluetooth® device is capable of supporting full scatternet or partial scatternet and the current desired role associated with the Bluetooth® link is a master role, at 1209, the incoming desired role may be set to a master role and a role switching policy procedure for the Bluetooth® link may be executed to indicate that no role switching may be required. If the current desired role associated with the Bluetooth® link is not a master role, at 1211, the incoming desired role may be set to a slave role and the Bluetooth® set link policy procedure may be executed to indicate that role switching is allowed. If the Bluetooth® device is not capable of supporting full scatternet or partial scatternet, at 1205, the Bluetooth® role switch procedure may be executed for the established Bluetooth® link making the Bluetooth® device a master. The procedure described above may be repeated for each of the links that are connected.

During an application connect and/or application disconnect procedure, the current desired role for a particular link may be master, slave, and/or "any" role. For each application that is associated with a particular link, it may be determined whether the device is capable of supporting a scatternet. If the desired role of the BT device for the corresponding application is different from the current desired role for that link, then the current desired role for the link may be set to the desired role for the application. The roles may then be updated utilizing the following exemplary code.

The following illustrates exemplary pseudo code that may be utilized for role management for complex Bluetooth® devices.

Definition of device capability constants:
    NO_SCATTERNET: The device does not support any scatternet; it can only support simple piconet. A role switch must be attempted when incoming or outgoing connections would create a scatternet.
    PARTIAL_SCATTERNET: The device supports scatternet for only a short period of time. A role switch must be attempted to avoid being in scatternet mode forever.
    FULL_SCATTERNET: The device can be in scatternet mode with no restrictions.
Definition of desired role constants:
    MASTER: desired role is piconet master
    SLAVE: desired role is piconet slave
    ANY: no preference
    ANY < SLAVE < MASTER
Data definitions:
    device_capabilities: either NO_SCATTERNET, PARTIAL_SCATTERNET, or FULL_SCATTERNET
    incoming_desired_role: set to MASTER or SLAVE; indicates whether to request role switch on incoming connections
    current_desired_role[link]: current desired role for link; MASTER, SLAVE, or ANY
    desired_role[application]: desired role for application; MASTER, SLAVE, or ANY
    outgoing_connection_in_progress: Used to handle role switch for outgoing connections; TRUE or FALSE
    number_of_links_connected: How many Bluetooth ® links are currently connected
Exemplary desired role table:
    profile id    application id    desired role
    profile_x     1                 MASTER
    profile_y     2                 MASTER
    profile_y     3                 ANY
    profile_z     4                 ANY
Exemplary Bluetooth ® procedure definitions:
    Bluetooth_Role_Switch( ): initiate Bluetooth ® role switch procedure on link.
    Bluetooth_Accept_Connection( ): Accept incoming Bluetooth ® connection.
    Bluetooth_Set_Link_Policy( ): Set role switching policy on the Bluetooth ® link;
Event definitions:
    Bluetooth ® Startup/Initialization: When the Bluetooth ® stack in the device is initialized, typically at system startup.
    Incoming Connection: Incoming Bluetooth ® connection from peer device.
    Link Connected: Bluetooth ® link connected.
    Link Disconnected: Bluetooth ® link disconnected.
    Application Connected: Application (profile) connected. (There can be more than one application on a Bluetooth ® link.)
    Application Disconnected: Application (profile) disconnected.
    Outgoing Connection: Outgoing connection initiated to peer device.
    Role switch Complete: Role switch operation complete, may or may not have succeeded.
Exemplary operating pseudo code:
    On Bluetooth Startup/Initialization,
        if device_capabilities = NO_SCATTERNET
            incoming_desired_role = MASTER
    On Incoming Connection,
        Bluetooth_Accept_Connection(incoming_desired_role)
    On Link Connected,
    On Link Disconnected,
        Adjust_Roles( )
    On Application Connect,
    On Application Disconnect,
        current_desired_role[link] = ANY
        for (each connected application on this link)
            if desired_role[application] > current_desired_role[link]
                current_desired_role[link] = desired_role[application]
        Adjust_Roles( )
    On Outgoing Connection,
        if (number of links connected > 0) and (link role = SLAVE) and (device_capabilities != FULL_SCATTERNET)
            Bluetooth_Role_Switch(link, MASTER)
            outgoing_connection_in_progress = TRUE
    On Role Switch Complete,
        if (outgoing_connection_in_progress = TRUE)
            continue with outgoing connection
    Procedure Adjust_Roles( )
        for each number_of_links_connected
            if (device_capabilities = NO_SCATTERNET) or
            if (device_capabilities = PARTIAL_SCATTERNET) and (current_desired_role[link] = MASTER)
                incoming_desired_role = MASTER
                Bluetooth_Set_Link_Policy(no role switch)
            else
                incoming_desired_role = SLAVE

```
        Bluetooth_Set_Link_Policy(allow role switch)
    if (current_desired_role[link] = MASTER) or
    if (device_capabilities != FULL_SCATTERNET) and
(number_of_links_connected > 1)
            Bluetooth_Role_Switch(link, MASTER)
```

Aspects of the present invention may be utilized for handling incoming connections and/or outgoing connections in a Bluetooth® piconet and/or scatternet.

In an exemplary aspect of the invention, role switching may be efficiently managed for applications that require multiple incoming connections. Incoming connections may be handled in accordance with a role switch profile information, rather than establishing a master role profile for each new incoming connection. For example, for a device with capabilities of PARTIAL_SCATTERNET and application desired_role=MASTER, a first incoming Bluetooth® connection may be characterized with Bluetooth_Accept_Connection(SLAVE). After the link is established, the device role on the link may be set to slave. An application may then be connected utilizing the established link, where current_desired_role=MASTER, incoming_desired_role=MASTER, and Bluetooth_Role_Switch(link, MASTER). A second incoming connection may be characterized with Bluetooth_Accept_Connection(MASTER) and the second connection may be established under a master role profile. After the second link is connected, device role on the second link may be set to MASTER.

In another exemplary aspect of the invention, role switching may be managed for simultaneous applications on the same link with different desired role requirements. For example, for application 1, desired_role[app 1]=ANY, and for application 2, desired_role[app 2]=MASTER. After application 1 connects, device role on link may be set to slave. Application 2 may connect on the same link and role switching may be characterized by utilizing the following set link policy procedure and role switch procedure: Bluetooth_Set_Link_Policy(no role switch), Bluetooth_Role_Switch(link, MASTER). In this regard, role switching may not be allowed. If Application 2 disconnects, role switching may be characterized by the following set link policy procedure: Bluetooth_Set_Link_Policy(allow role switch). In this regard, role switching may be allowed. The requirements of application 2, therefore, may trigger a role switch on the link. When application 2 disconnects, the link policy may be changed to allow role switch again.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

Therefore, at least the following is claimed:

1. A method, comprising:
 receiving, by a first personal area network device in a personal area network, a new connection from a second personal area network device, the new connection being associated with a first application in the first personal area network device having a first role preference; and
 establishing the new connection, the establishing comprising:
  determining whether the first role preference conflicts with a current role of the first personal area network device;
  determining whether the first role preference conflicts with a second role preference associated with a second application using the current role in the first personal area network device; and
  switching the current role of the first personal area network device to a role specified in the first role preference in response to determining that the first role preference conflicts with the current role and that the first role preference does not conflict with the second role preference.

2. The method of claim 1, wherein the establishing further comprises preserving the current role of the first personal area network device in response to determining that the first role preference does not conflict with the current role.

3. The method of claim 1, wherein the establishing further comprises preserving the current role of the first personal area network device in response to determining that the first role preference conflicts with the second role preference.

4. The method of claim 1, further comprising:
 determining whether the new connection is a scatternet connection; and
 switching the current role of the first personal area network device based at least in part on a scatternet capability of the first personal area network device in response to determining that the new connection is a scatternet connection.

5. The method of claim 4, wherein the scatternet capability corresponds to a partial scatternet capability that indicates support for the scatternet connection for a period of time.

6. The method of claim 1, wherein the first role preference and the second role preference are stored in a lookup table of the first personal area network device.

7. The method of claim 1, wherein the second application has an existing connection to the personal area network using the current role when the new connection is received.

8. The method of claim 1, wherein the first role preference and the second role preference respectively correspond to a master-only preference, a slave-only preference, or a master-or-slave preference.

9. A system, comprising:
a first personal area network device configured to:
receive a new connection from a second personal area network device in a personal area network, the new connection being associated with a first application in the first personal area network device having a first role preference;
determine whether the first role preference conflicts with a current role of the first personal area network device;
determine whether the first role preference conflicts with a second role preference associated with a second application using the current role in the first personal area network device; and
switch the current role of the first personal area network device to a role specified in the first role preference in response to determining that the first role preference conflicts with the current role and that the first role preference does not conflict with the second role preference.

10. The system of claim 9, wherein the first personal area network device is further configured to refrain from switching the current role of the first personal area network device in response to determining that the first role preference does not conflict with the current role.

11. The system of claim 9, wherein the first personal area network device is further configured to refrain from switching the current role of the first personal area network device in response to determining that the first role preference conflicts with the second role preference.

12. The system of claim 9, wherein the first personal area network device is further configured to:
determine whether the new connection is a scatternet connection; and
switch the current role of the first personal area network device based at least in part on a scatternet capability of the first personal area network device in response to determining that the new connection is a scatternet connection.

13. The system of claim 12, wherein the scatternet capability corresponds to a partial scatternet capability that indicates support for the scatternet connection for a period of time.

14. The system of claim 9, wherein the first role preference and the second role preference are stored in a lookup table of the first personal area network device.

15. The system of claim 9, wherein the second application has an existing connection to the personal area network using the current role when the new connection is received.

16. The system of claim 9, wherein the first role preference and the second role preference respectively correspond to a master-only preference, a slave-only preference, or a master-or-slave preference.

17. A system, comprising:
a first personal area network device configured to:
receive a new connection from a second personal area network device in a personal area network, the new connection being associated with a first application in the first personal area network device;
determine a first role preference associated with the first application;
determine whether the first role preference conflicts with a current role of the first personal area network device based at least in part on a scatternet capability of the first personal area network device;
determine whether the first role preference conflicts with a second role preference associated with a second application using the current role in the first personal area network device; and
switch the current role of the first personal area network device to a role specified in the first role preference in response to determining that the first role preference conflicts with the current role and that the first role preference does not conflict with the second role preference.

18. The system of claim 17, wherein the first personal area network device is further configured to delay switching the current role of the first personal area network device based at least in part on the scatternet capability being a partial scatternet capability.

19. The system of claim 17, wherein the switching is delayed until an existing connection used by the second application is disconnected.

20. The system of claim 17, wherein the new connection is an outgoing connection.

* * * * *